(12) United States Patent
Kinstler

(10) Patent No.: US 7,346,010 B2
(45) Date of Patent: Mar. 18, 2008

(54) HYBRID DATA BUS FOR ACHIEVING DETERMINISTIC PERFORMANCE FOR NON-DETERMINISTIC NETWORK BUS TYPE INTERFACES

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 1007 days.

(21) Appl. No.: 10/340,298

(22) Filed: Jan. 10, 2003

(65) Prior Publication Data

US 2004/0136381 A1 Jul. 15, 2004

(51) Int. Cl.
*H04L 12/28* (2006.01)
(52) U.S. Cl. .................... 370/257; 370/402; 370/466
(58) Field of Classification Search ............... None
See application file for complete search history.

(56) References Cited

U.S. PATENT DOCUMENTS

| | | | |
|---|---|---|---|
| 5,432,907 A * | 7/1995 | Picazo et al. ............... 709/249 |
| 5,940,399 A | 8/1999 | Weizman | |
| 6,178,177 B1 | 1/2001 | Vautey | |
| 6,778,552 B1 * | 8/2004 | James et al. ............... 370/465 |
| 6,822,946 B1 * | 11/2004 | Wallace ..................... 370/328 |
| 6,826,151 B1 * | 11/2004 | Li et al. .................... 370/230.1 |
| 6,831,928 B1 * | 12/2004 | Hauck et al. .............. 370/489 |
| 7,020,076 B1 * | 3/2006 | Alkalai et al. ............. 370/217 |
| 2002/0131454 A1 | 9/2002 | Franke et al. | |
| 2002/0141418 A1 * | 10/2002 | Ben-Dor et al. ........... 370/398 |
| 2003/0233398 A1 * | 12/2003 | Kinstler ..................... 709/201 |

OTHER PUBLICATIONS

IEEE 1394b—IEEE Standard for a High-Performance Serial Bus, 2002, pp. cover, 13, 30, 184, 204, 205, & 225.*

* cited by examiner

*Primary Examiner*—Edan Orgad
*Assistant Examiner*—Jung Park
(74) *Attorney, Agent, or Firm*—Harness, Dickey & Pierce, P.L.C.

(57) ABSTRACT

The hybrid data bus includes client nodes and an IEEE-1394b-based network operably associated with those client nodes. At least one of the client nodes is a legacy-based client node that utilizes a non-deterministic network bus type for network interfacing. An IEEE-1394b-based network is operably associated with the client nodes via at least one network interface bridge (NIB). The IEEE-1394b-based network provides a deterministic data passing capability between the legacy-based client node and at least one other of the client nodes.

1 Claim, 3 Drawing Sheets

HYBRID DATA BUS FOR ACHIEVING DETERMINISTIC PERFORMANCE FOR NON-DETERMINISTIC NETWORK BUS TYPE INTERFACES

BACKGROUND OF THE INVENTION

1. Field of the Invention

This invention relates to establishing data communication between client nodes over a network and more particularly to establishing deterministic network performance between client nodes which use normally nondeterministic (legacy) bus types.

2. Description of the Related Art

Modern system applications increasingly require the capabilities of a high-speed data bus network that not only has plentiful bandwidth, but can also provide a deterministic quality of service in providing inter-node communication. Some of the most popular shared bandwidth high-speed data buses such as Ethernet and Fibre Channel (Arbitrated Loop), etc., though providing much-improved bandwidths over earlier buses, do not inherently provide time-deterministic performance as part of their protocol.

Attempts to achieve time-deterministic data delivery over such networks have given rise to techniques currently coming to market such as introducing one or several (as necessary) time-deterministic buffer switches between all nodes of a network (e.g., Next Generation System's Copperhead™ deterministic Ethernet crossbar switch), and creating deterministic point-to-point multi-hop connections between pairs of communicating client nodes routed through one or more crossbar switches, while retaining the original data bus protocol (e.g., Ethernet) on all links of the network. Such an approach can involve considerable expense, as with the Copperhead™ Ethernet switches being priced at about $10,000 each. A network of ten such switches with 8 ports each (totaling $100,000) are required to provide connectivity between 60 nodes. All that expense is incurred trying to provide determinism to the Ethernet protocol.

An approach is needed for allowing multiple high speed buses, whether inherently non-deterministic in nature or not, to achieve deterministic messaging capability and to co-exist and reside on a single primary vehicle network type. The present subject invention provides time-deterministic capability between nodes supported by otherwise non-deterministic network types in a simpler and lower cost manner than other techniques currently coming to market.

The subject invention provides deterministic messaging capability between nodes which interface with and communicate over normally non-deterministic legacy data buses (e.g., Ethernet, Universal Serial Bus (USB) or Fibre Channel Arbitrated Loop). This is accomplished by merging the time-deterministic capabilities of a shared bandwidth, multi-node, deterministic bus (viz., IEEE-1394b) with dedicated (un-contended) point-to-point connections for the first and last leg connections to the otherwise non-deterministic legacy node interfaces.

Some software methods have been developed for partitioning such functions across an arbitrary network and connecting them together with a communications protocol. One such method and standard is known as the Scalable Coherent Interface, and is defined by the open system standard IEEE-1596.

SUMMARY OF THE INVENTION

In a broad aspect, the hybrid data bus of the present invention includes client nodes and an IEEE-1394b-based network operably associated with those client nodes. At least one of the client nodes is a legacy-based client node that utilizes a non-deterministic network bus type for network interfacing. An IEEE-1394b-based network is operably associated with the client nodes via at least one network interface bridge (NIB). The IEEE-1394b-based network provides a deterministic data passing capability between the legacy-based client node and at least one other of the client nodes.

The hybrid data bus of the present invention may be implemented in a hub-based topology including hub-based subnetworks interconnected by IEEE-1394b hub-hub interconnects. In such an instance at least one of the client nodes is a legacy-based client node that utilizes a normally non-deterministic bus type hub-client node interconnect for connection to an associated network interface bridge (NIB) of a hub. A deterministic data passing capability is provided between the legacy-based client node and the other client nodes. The present invention may alternatively, or in addition, be implemented in a hub-less network topology.

In either a hub-based or hub-less version, the present invention offers significant cost advantages over current or prior art offerings in industry by leveraging the inherent deterministic nature of the IEEE-1394b databus protocol. Savings of approximately twenty times over current industry offerings for similar capability are readily possible with the current invention, as described below.

DETAILED DESCRIPTION OF THE INVENTION

Figure 1:
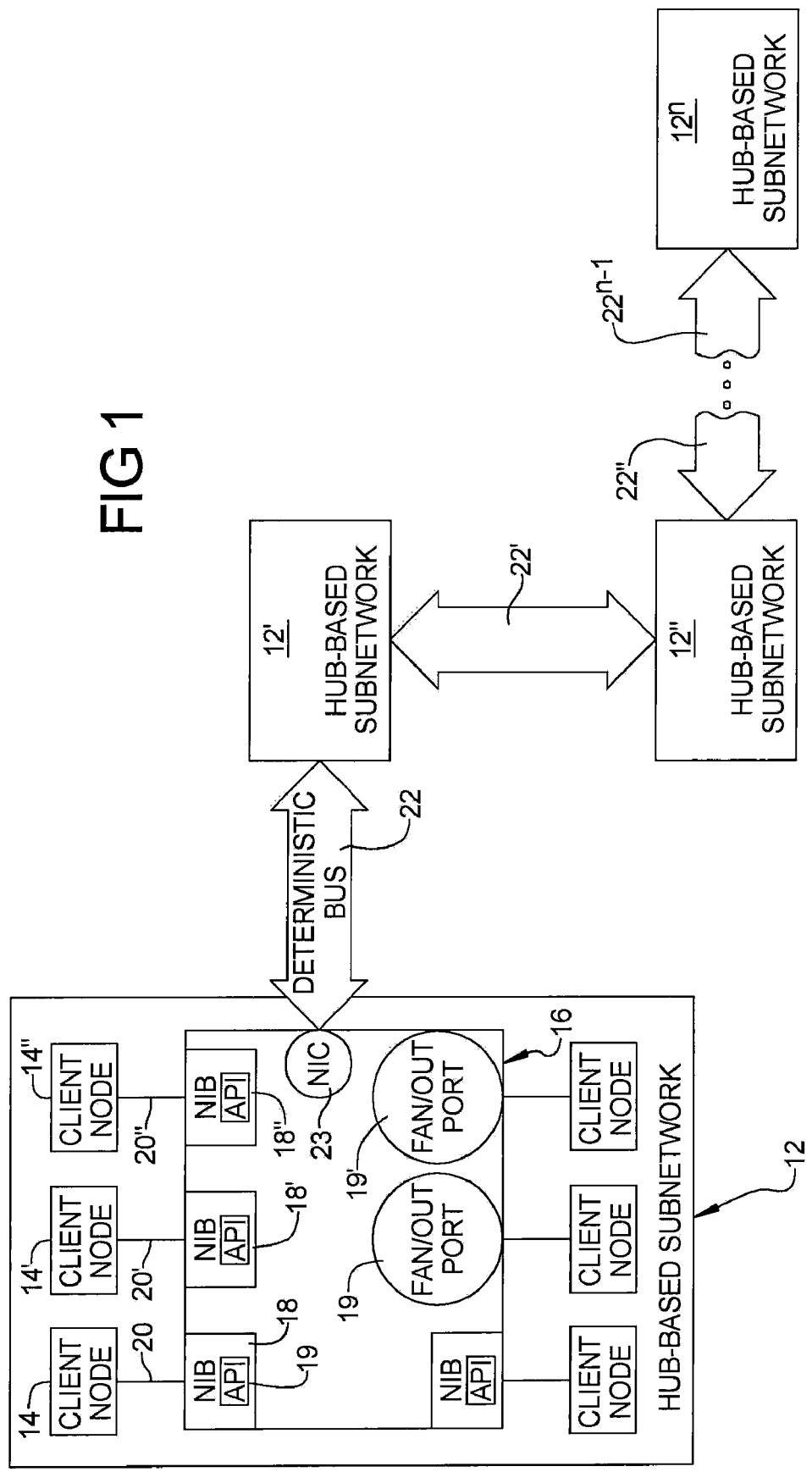
FIG. 1 is a schematic illustration of a first embodiment of the hybrid data bus of the present invention, showing its utilization in hub-based network topology.

Referring to the drawings and the characters of reference marked thereon, FIG. 1 illustrates a first embodiment of the hybrid data bus of the present disclosure, designated generally as 10. The system 10 illustrated in FIG. 1 utilizes a hub-based network topology. The system 10 includes a number of hub-based subnetworks, designated generally as 12, 12', 12", . . . 12′′′. Each hub-based subnetwork includes at least one client node, or as shown in this figure, a number of client nodes 14, 14', 14", . . . 14′′′ and a hub 16. The hub 16 includes at least one, or as shown in this figure, a number of co-located network interface bridges (NIBs) 18, 18', 18", . . . 18′′′. The hub 16 may include one or more fan-out ports 19, 19', 19", . . . 19′′′. The fan-out ports 19, 19', 19", . . . 19′′′ provide additional branch-out locations for client nodes 14 which are already IEEE-1394b bus capable. Hub-client node interconnects 20, 20', 20", . . . 20′′′ connect the client nodes 14, 14', 14", . . . 14′′′ to their respective NIBs 18, 18', 18", . . . 18′′′.

IEEE-1394b hub-hub interconnects 22, 22', 22", . . . 22''' connect a hub 16 of a hub-based subnetwork to the hub, e.g. 16', of an adjacent hub-based subnetwork, e.g. 12'.

Each NIB 18 has the capability to provide a bridging function between a client node 14 equipped with a non-deterministic type legacy signal interface and the deterministic high-speed data bus (HSDB) network of the present invention, either directly or through a network interface card (NIC) 23 bridge to the HSDB network.

In the embodiment depicted in FIG. 1, each hub 16 is constructed of a deterministic HSDB-capable-port interfacing to a hub-hub interconnect 22 through a NIC 23, with data being interfaced between that NIC 23 and each NIB 18 via internal hub 16 circuitry. In this case, all NIB's 18 in a single hub 16 share one common node presence on the HSDB network.

Alternatively (figure not provided), a hub may be constructed such that each NIB 18 is connected internally within its hub 16 in a daisy chain fashion, or in a tree topology branching out from a multiple-pod physical layer signal regeneration node in a typical IEEE-1394-based implementation. In this latter case, each NIB 18 presents its own independent node presence on the HSDB network, thereby increasing total node count on the HSDB network.

At least one of the client nodes 14, 14', 14", . . . 14''' is a legacy-based client node that uses a normally non-deterministic bus type hub-client node interconnect 20 for connection to its associated NIB 18. Those of the client nodes 14, 14', 14", . . . 14''' that are not legacy-based, but are instead directly IEEE-1394b HSDB-capable, need not interface through a NIB 18, but instead may interface directly with the IEEE-1394b HSDB network through their own resident NIC 23. This resident NIC 23 may be directly connected to any access port on the HSDB network including any of the fan-out ports 19. Generally, most if not all of the client nodes are legacy-based. The normally non-deterministic bus type hub—client node interconnect 20 may be, for example, an Ethernet class bus type, a USB class bus type, or a Fibre Channel class bus type.

Preferably, each NIB 18 serves a single one of the legacy-based client nodes 14. However, it is possible that a single NIB 18 may serve two or more of such legacy-based client nodes 14. A rule-based code is preferably provided by an Application Program Interface (API) bus manager software program 19 to provide deterministic access and data passing performance between the client nodes 14. The rule-based code manages the allocation of a suitable fraction of the bandwidth of the deterministic HSDB to each of the hub-client node interconnects 20, 20', 20", . . . 20'''. The total allocation to all client nodes 14 may be up to 100%. The rule-based code may use an asynchronous method for accessing the IEEE-1394b HSDB-based network using its fairness protocol in supporting service to the hub-client node interconnects 20, 20', 20", . . . 20'''. The ruled-based code manages the maximum message size employed by each of the client nodes 14. This limits the maximum time that the next access to the HSDB is granted to another node, thereby facilitating low latency bus access.

The ruled-based code provides for only a single access by each client node 14 to the IEEE-1394b-based network until all the client nodes 14 have had an opportunity for their respective access. Using bandwidth allocation (in the isochronous mode) or fairness protocol (in the asynchronous mode), maximum bus access latencies (and therefore determinism) may thereby be guaranteed for all nodes 14. For the isochronous access method, maximum latency for all nodes is approximately the isochronous cycle frame time, which is nominally 125 microseconds. For the asynchronous bus access method, the maximum latency is the product of the maximum message length for each node (in microseconds) times the number of nodes on, or seeking access to, the IEEE-1394b -based network.

The rule-based code may implement a time-based method for allowing cyclic access to the IEEE-1394b-based network. The timing provides the deterministic repeating interval of access to the IEEE-1394b-based network. Alternatively, the ruled-based code may maximize determinism by assigning explicit time-slots to respective client nodes within an allocated repeated time interval. As shown in FIG. 1 the subnetworks 12 are serially connected. However, it is understood that they may be connected in a tree-type hierarchy.

Figure 2:
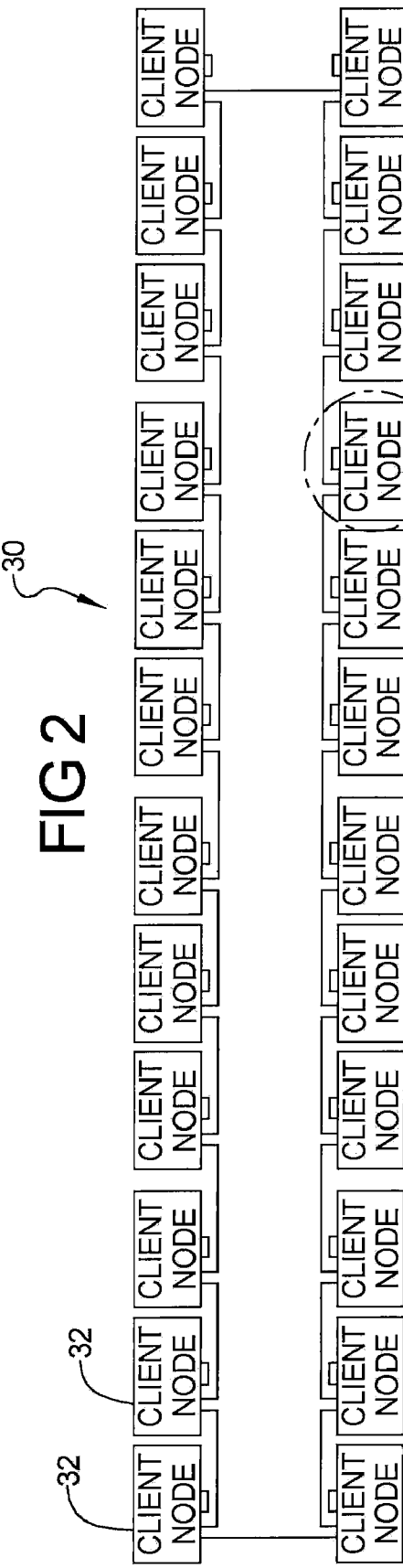
FIG. 2 is a schematic illustration of a second embodiment of the hybrid data bus of the present invention, showing its utilization in a hub-less network topology.
Figure 2A:
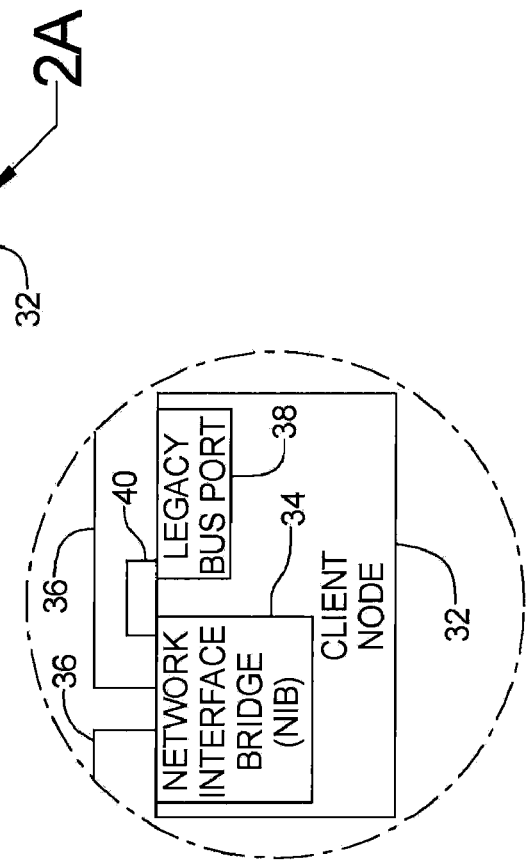
FIG. 2A is an enlarged portion of FIG. 2, showing details of the client node.

Referring now to FIGS. 2 and 2A, a second preferred embodiment of the hybrid data bus is illustrated, designated generally as 30, which utilizes a hub-less topology. The hybrid data bus 30 includes a number of client nodes 32. At least one NIB 34 is co-located and operably associated with a respective client node 32. At least one of the client nodes 32 is a legacy-based client node. IEEE-1394b client node-client node interconnects 36 connect a client node 32 to an adjacent client node 32 through a NIB 34. A legacy bus port 38 is associated with a respective client node 32. A wrap-around interconnect 40 is positioned between the NIB 34 and its associated legacy bus port 38 for operably connecting the NIB 34 to the associated legacy port 38. The legacy bus port receives data formatted in accordance with the protocol inherent to the legacy-based client node 38. The hub-less topology offers an advantage in network architectures of minimizing the quantity of individual equipment boxes required to implement a network connectivity by eliminating the need for hubs, as well as the total associated interconnecting wiring.

Figure 3:
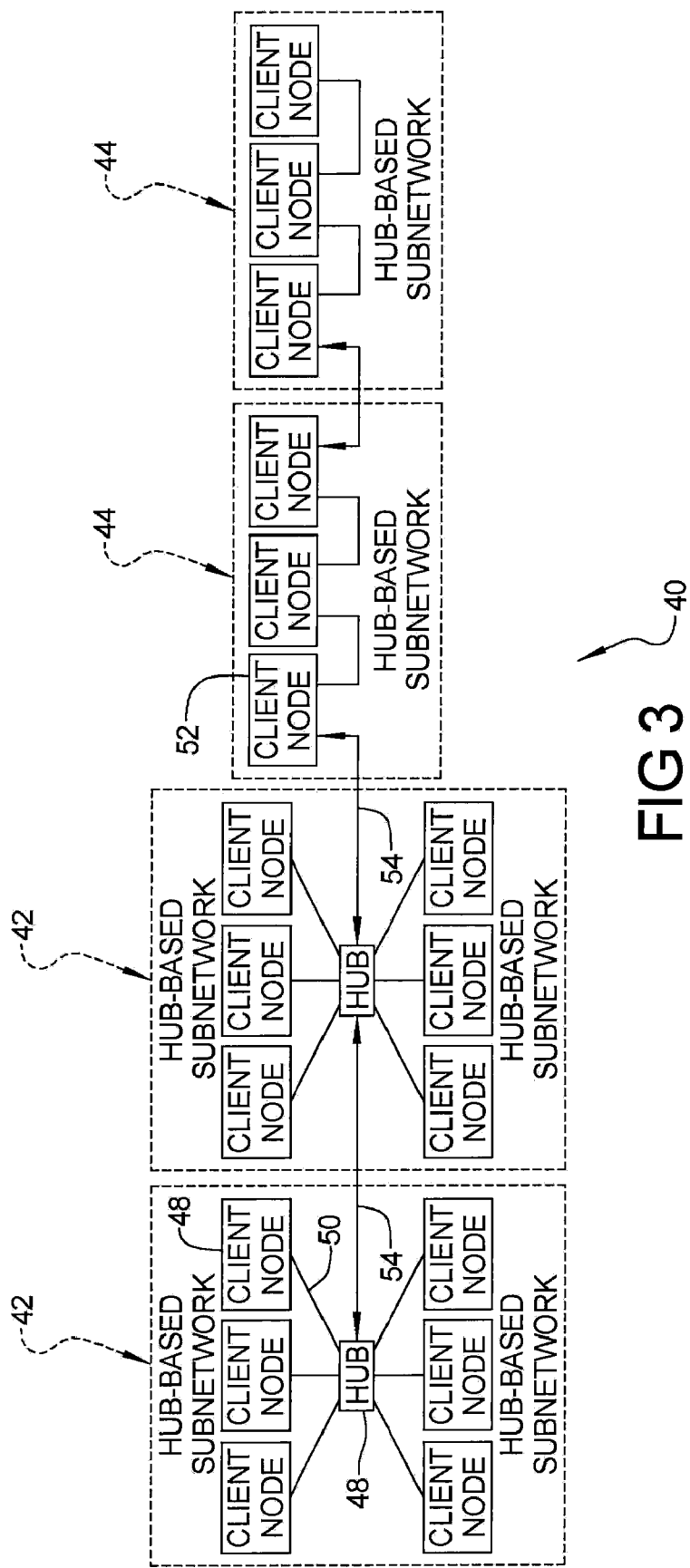
FIG. 3 is a schematic illustration of a third embodiment of the hybrid data bus of the present invention, showing its utilization in a mixed combination of hub-based and hub-less network topology subnetworks.

Referring now to FIG. 3 it can be seen that the principles discussed above with respect to a hub-based topology and a hub-less topology can be extended to provide a hybrid data bus, designated generally as 40, having a mixed combination of hub-based subnetworks 42 and hub-less network topology subnetworks 44. The hub-based subnetwork 42, includes at least one hub-based subnetwork client node 46, a hub 48 having at least one NIB and at least one hub-client node interconnect 50. This hub-based subnetwork 42 is as described above with respect to FIG. 1. Each hubless subnetwork 44 includes hubless subnetwork client nodes 52, the client nodes being as described above with respect to FIG. 2. IEEE-1394b subnetwork-subnetwork interconnects 54 provide connections for the respective adjacent subnetworks.

As discussed above, in the Description of the Related Art, the present invention offers substantial cost savings over prior art approaches to creating determinism between client nodes which employ a normally non-deterministic data bus type. For instance, attempts to achieve time-deterministic data delivery over such networks have given rise to techniques currently coming to market such as introducing one or several (as necessary) time-deterministic buffer switches between all nodes of a network (e.g., Next Generation System's COPPERHEAD™ deterministic Ethernet crossbar switch), and creating deterministic point-to-point multi-hop connections between pairs of communicating client nodes routed through one or more crossbar switches, while retaining the original databus protocol (e.g., Ethernet) on all links of the network. Such an approach can involve considerable expense, as with the COPPERHEAD™ Ethernet switches being priced at about $10,000 each. Ten such switches with 8 ports each (totaling $100,000) are required to provide connectivity between 60 nodes. All this expense is incurred trying to provide determinism to the Ethernet protocol.

Instead, the present system and method makes use of the inherently deterministic capability of the IEEE-1394b high speed data bus to distribute signals between all nodes on the network, providing only an Ethernet conversion at each end. Such hubs would typically cost much less, consisting of essentially two to six IEEE-1394 branching ports (totaling approximately $50 for a copper network) plus six or eight Ethernet ports (at $30 for each port), plus minimal datablock conversion buffers, totaling on the order of $500 each for an entire hybrid hub. This would add up to a total of only about $5,000 to connect the same 60-node network (a 20X reduction over the aforementioned approach). A hub-based configuration type similar to FIG. 1 would be used to implement the equivalent of the network employing COPPERHEAD™ Ethernet switching.

Thus, while embodiments of the devices and methods have been described in reference to the environment in which they were developed, they are merely illustrative of the principles of the inventions. Other embodiments and configurations may be devised without departing from the spirit of the inventions and the scope of the appended claims.

The invention claimed is:

1. A hybrid data bus having a mixed combination of hub-based and hub-less network topology subnetworks, comprising:
   a) at least one hub-based subnetwork, comprising:
      i) at least one hub-based subnetwork client node;
      ii) a hub, said hub comprising at least one network interface bridge (NIB); and,
      iii) at least one hub-client node interconnect, said hub-client node interconnect for connecting a client node through an associated NIB;
   b) at least one hubless subnetwork, comprising a plurality of hubless subnetwork client nodes; and,
   c) at least one of IEEE-1394b subnetwork-subnetwork interconnect for connecting respective adjacent subnetworks, wherein said at least one hub-based subnetwork client node or one of said plurality of hubless subnetwork client nodes utilizes a normally non-deterministic bus type client node interconnect to the remainder of the hybrid data bus, thus providing deterministic data passing capability of the hybrid data bus between said legacy-based client node and at least one other of said plurality of client nodes.

* * * * *